Patented June 2, 1953

2,640,838

UNITED STATES PATENT OFFICE 2,640,838

$\Delta^{9(11)}$-PREGNENES AND PROCESS

Norman L. Wendler, Summit, Robert P. Graber, Elizabeth, and Alfred C. Haven, Jr., Linden, N. J., assignors to Merck & Co., Inc., Rahway, N. J., a corporation of New Jersey No Drawing. Application May 22, 1952, Serial No. 289,441

13 Claims. (Cl. 260—397.4)

This invention relates to the preparation of the new chemical compounds, $\Delta^{4,9(11)}$-pregnadiene-17($\alpha$),21-diol-3,20-dione-21-acylates. It is also concerned with the preparation of the novel compounds, 4 - bromo-$\Delta^{9(11)}$-pregnene-17($\alpha$),21-diol-3,20-dione-21-acylates, produced as intermediates in our novel process.

The new chemical compound with which our invention is concerned, $\Delta^{4,9(11)}$ - pregnadiene-17($\alpha$),21-diol-3,20-dione-21-acetate, also known as $\Delta^{9(11)}$-dehydro compound S acetate, and 11(9)-anhydro compound F acetate, possesses cortisone-like activity. (11(9)-anhydro compound F acetate has been tested for local activity by the cotton-pellet granuloma test. The results indicate a very high order of local activity for this compound.)

It is known that the 3-diethyl ketal of 20-cyano-17-pregnene-21-ol-3,11-dione can be reduced with lithium borohydride. The ketal grouping can be removed and 20-cyano-17-pregnene-11($\beta$),21-diol-3-one recovered. Upon acylation of the latter compound $\Delta^{17}$-20-cyano-pregnene-11($\beta$),21-diol-3-one-21-acylate can be recovered. This procedure for recovering $\Delta^{17}$-20-cyanopregnene-11($\beta$),21-diol-3-one-21-acetate is fully described in the Journal of the American Chemical Society, vol. 72, page 5793 (1950). Other $\Delta^{17}$-20-cyanopregnene - 11($\beta$),21 - diol - 3-one-21-acylates may also be used.

The $\Delta^{17}$ - 20 - cyanopregnene-11($\beta$),21-diol-3-3-one-21-acylate obtained as above can be dehydrated to form $\Delta^{9(11),17}$-20-cyanopregnadiene-21-ol-3-one-acylate. The latter compound can be reacted with osmium tetroxide to form the 17,20-osmate ester of $\Delta^{9(11)}$-20-cyanopregnene-17($\alpha$),20,21-trihydroxy - 3 - one-21-acylate. Hydrolysis of the latter compound results in $\Delta^{9(11)}$-pregnene - 17($\alpha$),21-diol-3,20-dione - 21 - acylate, which is the starting material utilized in our novel process. This general procedure for obtaining $\Delta^{9(11)}$-pregnene-17($\alpha$),21-diol-3,20-dione-21-acylate is fully described and claimed in a co-pending application of Norman L. Wendler and Robert P. Graber, Serial No. 289,442, filed May 22, 1952 (Case No. 3382).

The starting material, $\Delta^{9(11)}$-pregnene-17($\alpha$),-21-diol-3,20-dione-21-acylate employed in our novel process may be represented by the formula:

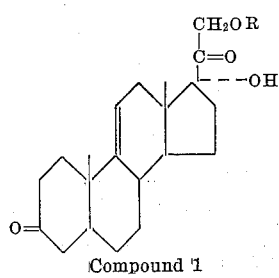

Compound 1 wherein R is an acyl group.

In accordance with our process the above compound is reacted with bromine to form the 4-bromo -$\Delta^{9(11)}$-pregnene-17($\alpha$),21-diol-3,20-dione-21-acylate, which may be represented by the structural formula:

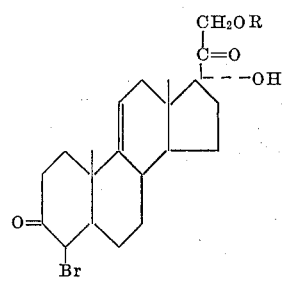

Compound 2 wherein R is as above.

Dehydrohalogenation of 4-bromo-$\Delta^{9(11)}$-pregnene-17($\alpha$),21-diol-3,20-dione-21-acylate results in the $\Delta^{4,9(11)}$-pregnadiene-17($\alpha$),21 - diol - 3,20-dione-21-acylate, which may be represented by the formula:

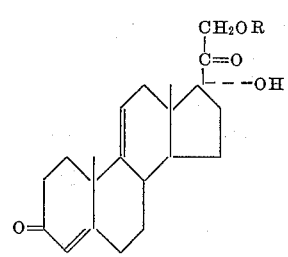

Compound 3 wherein R is as above.

$\Delta^{4,9(11)}$ - pregnadiene-17($\alpha$),21-diol-3,20-dione-21-acetate was tested for local tissue activity by the method of Meier, Schuler and Desaulles (Experientia, 6, 469, 1950). This technique consists of implantation of cotton pellets subcutaneously in rats. This stimulates the growth of granuloma tissue, which can be inhibited by cortisone. In these tests, two pellets were placed in each rat, one on each side of the abdomen, the one on the right side being soaked with 0.1 ml. of suspending medium containing 0.5 mgm. of the steroid $\Delta^{4,9(11)}$-pregnadiene-17-($\alpha$),21-diol-3,20-dione-21-acetate; and the one on the left soaked with 0.1 ml. of suspending medium only. The pellets were left in place in the animals for six days. They were then dissected out and dried to constant weight. The following results were obtained:

| | Increment in dry weight | | Percent inhibition |
| --- | --- | --- | --- |
| | Control pellet | Steroid pellet | |
| First test | 30.3 | 17.0 | 43.9 |
| Second test | 41.2 | 18.2 | 55.8 |

This indicates a very high order of local activity.

"Per cent inhibition" is calculated as follows:

$$\frac{a-b}{a} \times 100 = \text{percent inhibition}$$

where
$a$=increment in dry weight of control pellet
$b$=increment in dry weight of steroid pellet In accordance with a preferred embodiment of our invention the $\Delta^{9(11)}$-17($\alpha$),21-diol-3,20-dione-21-acetate is reacted with bromine, preferably in the presence of acetic acid to produce 4-bromo-$\Delta^{9(11)}$-pregnene-17($\alpha$),21-diol-3,20-dione-21-acetate. We have found it preferable to keep the acetic acid solution cold during the bromination. The 4-bromo-$\Delta^{9(11)}$-pregnene-17($\alpha$),21-diol-3,20-dione-21-acetate is isolated from the reaction mixture by diluting with water and extracting the resulting suspension with an organic solvent such as benzene or chloroform. The organic solvent extracts are washed with water, concentrated to dryness and the residual material may be recrystallized from a solvent such as ether.

The 4-bromo-$\Delta^{9(11)}$-pregnene-17($\alpha$),21-diol-3,20-dione-21-acetate is then reacted with a dehydrohalogenating agent such as pyridine, or with semicarbazide or 2,4-dinitrophenylhydrazine followed by aqueous pyruvic acid, thus removing the elements of hydrogen bromide to produce the $\Delta^{4,9(11)}$-pregnadiene-17($\alpha$),21-diol-3,20-dione-21-acetate.

The preferred dehydrohalogenation reaction is carried out by reacting 4-bromo-$\Delta^{9(11)}$-pregnene-17($\alpha$),21-diol-3,20-dione-21-acetate with semicarbazide, by heating the reactants together in acetic acid solution for about two hours in an inert atmosphere. The reaction mixture is cooled and a mixture of anhydrous sodium acetate and aqueous pyruvic acid is added to the cooled mixture. The resulting mixture is then heated for one hour at 90° C., preferably in an inert atmosphere. The reaction mixture is diluted with water and the product extracted with a water immiscible organic solvent such as chloroform or benzene. The organic solvent extract is evaporated to dryness, and the residue recrystallized from a suitable solvent such as a chloroform-ether mixture to yield pure $\Delta^{4,9(11)}$-pregnadiene-17($\alpha$),21-diol-3,20-dione-21-acetate.

An alternative procedure involves the utilization of pyridine whereby the reaction mixture of pyridine and of 4-bromo-$\Delta^{9(11)}$-pregnene-17($\alpha$),21-diol-3,20-dione-21-acetate is heated under reflux for an extended period of time. The pyridine is then evaporated under reduced pressure and the residual material is dissolved in an organic solvent such as chloroform or benzene and washed free of pyridine with dilute mineral acid. The organic solvent is evaporated and the residue is recrystallized from a suitable solvent such as a chloroform-ether mixture.

The following examples illustrate methods of carrying out the present invention, but it is to be understood that these examples are given primarily by way of illustration and not of limitation.

EXAMPLE 1

*Preparation of 4 - bromo - $\Delta^{9(11)}$-pregnene-17($\alpha$), 21-diol-3,20-dione-21-acetate (compound 2)*

The 3-diethyl ketal of 20-cyano-17-pregnene-21-ol-3,11-dione was reduced with lithium borohydride. After removal of the ketal grouping, the 20-cyano-17-pregnene-11($\beta$),21-diol-3-one which was recovered, was acetylated to form $\Delta^{17}$-20-cyanopregnene-11($\beta$),21-diol-3-one-21-acetate. This procedure is fully described in the Journal of the American Chemical Society, vol 72, page 5793 (1950).

The $\Delta^{17}$-20-cyanopregnene-11($\beta$),21-diol-3-one-21-acetate thus obtained was dehydrated to form $\Delta^{9(11),17}$-20-cyanopregnadiene-21-ol-3-one-acetate. The latter compound was reacted with osmium tetroxide to form the 17,20-osmate ester of $\Delta^{9(11)}$-20-cyanopregnene-17($\alpha$),20,21-trihydroxy-3-one-21-acetate. This osmate ester was hydrolyzed to form $\Delta^{9(11)}$-pregnene-17($\alpha$),21-diol-3,20-dione-21-acetate, which is our starting material. This procedure for preparing $\Delta^{9(11)}$-pregnene-17($\alpha$),21-diol-3,20-dione-21-acetate is fully described and claimed in a co-pending application of two of the inventors, Norman L. Wendler and Robert P. Graber, Serial No. 289,442, filed May 22, 1952 (Case No. 3382).

1.02 grams of $\Delta^{9(11)}$-pregnene-17($\alpha$),21-diol-3,20-dione-21-acetate thus prepared was dissolved in 35 ml. of glacial acetic acid and cooled with stirring to just above the freezing point. The solution was treated dropwise with 27.5 ml. of 0.10M bromine in pure acetic acid, at such a rate that no great excess of bromine was ever present. The addition required fifty minutes. The resulting solution was poured into water and extracted three times with chloroform. The combined extracts were washed acid-free with sodium bicarbonate, then with water and concentrated. On addition of ether there separated 4-bromo-$\Delta^{9(11)}$-pregnene-17($\alpha$),21-diol-3,20-dione-21-acetate, having a melting point of 206–206.5° C. (dec.). On concentration of the mother liquors a second crop was obtained, melting point 197.5–198° C. (dec.). The 4-bromo-$\Delta^{9(11)}$-pregnene-17($\alpha$),21-diol-3,20-dione-21-acetate, after recrystallization, had a constant melting point of 211.5–212° C. (dec.).

Analysis calculated for $C_{23}H_{31}O_5Br$: Br, 17.0. Found: Br, 16.97.

The combined mother liquors were concentrated to an oil and stirred 40 minutes with an equal weight of zinc dust in 5 ml. of acetic acid at 90° C. After the suspension was filtered, the filtrate was poured into water, extracted with chloroform, and then washed neutral with sodium bicarbonate solution followed by a water wash. The extracts were concentrated to an oil and crystallized by adding ether. There was recovered $\Delta^{9(11)}$-pregnene-17($\alpha$),21-diol-3,20-dione-21-acetate, i. e., unreacted starting material, which can be subjected to further bromination.

EXAMPLE 2

*Preparation of $\Delta^{4,9(11)}$-pregnadiene-17($\alpha$),21-diol-3,20-dione-21-acetate (compound 3)*

A solution of 0.52 g. of 4-bromo-$\Delta^{9(11)}$-pregnene-17($\alpha$),21-diol-3,20-dione-21- acetate in 15 ml. of glacial acetic acid was treated for one hour at 90° C. under nitrogen with a solution of 0.435 g. of semicarbazide hydrochloride, 0.50 g. of anhydrous sodium acetate and 1 ml. of water in 35 ml. of acetic acid. Then a solution of 2 ml. of pyruvic acid, 0.60 g. of anhydrous sodium acetate and 3 ml. of water was added and the mixture heated one hour at 90° C. under nitrogen. The reaction mixture was cooled, poured into excess water and extracted three times with chloroform. The combined extracts were washed with aqueous sodium bicarbonate and with water and concentrated to dryness. The extract residue was crystallized from a chloroform-ether mixture to yield $\Delta^{4,9(11)}$ - pregnadiene - 17($\alpha$),21-diol - 3,20 - dione - 21 - acetate, having a melting point of 215–225° C. After several recrystallizations from a mixture of chloroform and ether, $\Delta^{4,9(11)}$ - pregnadiene - 17($\alpha$),21 - diol - 3,20-dione-21-acetate obtained had a constant melting point of 231.5–234.5° C.

Analysis calculated for $C_{23}H_{30}O_5$: C, 71.47; H, 7.83. Found: C, 71.26; H, 7.78.

Modifications may be made in carrying out the present invention without departing from the spirit and scope thereof and the invention is to be limited only by the appended claims.

We claim:

1. 4 - bromo - $\Delta^{9(11)}$ - pregnene - 17($\alpha$),21-diol-3,20-dione-21-acylate.

2. 4-bromo-$\Delta^{9(11)}$-pregnene-17($\alpha$),21-diol-3,20-dione-21-acetate.

3. $\Delta^{4,9(11)}$ - pregnadiene - 17($\alpha$),21 - diol - 3,20-dione-21-acylate.

4. $\Delta^{4,9(11)}$ - pregnadiene - 17($\alpha$),21 - diol - 3,20-dione-21-acetate.

5. The process that comprises reacting $\Delta^{9(11)}$-pregnene- 17($\alpha$),21 - diol - 3,20 - dione - 21 - acylate with bromine to form 4-bromo-$\Delta^{9(11)}$-pregnene - 17($\alpha$),21 - diol - 3,20 - dione - 21-acylate and reacting the latter compound with a dehydrohalogenating agent to form $\Delta^{4,9(11)}$-pregnadiene - 17($\alpha$),21 - diol - 3,20 - dione - 21-acylate.

6. The process that comprises reacting $\Delta^{9(11)}$-pregnene - 17($\alpha$),21 - diol - 3,20 - dione - 21-acetate with bromine to form 4-bromo-$\Delta^{9(11)}$-pregnene - 17($\alpha$),21 - diol - 3,20 - dione - 21-acetate and reacting the latter compound with a dehydrohalogenating agent to form $\Delta^{4,9(11)}$-pregnadiene - 17($\alpha$),21 - diol - 3,20 - dione - 21-acetate.

7. The process that comprises reacting $\Delta^{9(11)}$-pregnene - 17($\alpha$),21 - diol - 3,20 - dione - 21-acylate with bromine to form 4-bromo-$\Delta^{9(11)}$-pregnene - 17($\alpha$),21 - diol - 3,20 - dione - 21-acylate.

8. The process that comprises reacting $\Delta^{9(11)}$-pregnene - 17($\alpha$),21 - diol - 3,20 - dione - 21-acetate with bromine to form 4-bromo-$\Delta^{9(11)}$-pregnene - 17($\alpha$),21 - diol - 3,20 - dione - 21-acetate.

9. The process that comprises reacting 4-bromo - $\Delta^{9(11)}$ - pregnene - 17($\alpha$),21 - diol - 3,20-dione-21-acylate with a dehydrohalogenating agent to form $\Delta^{4,9(11)}$-pregnadiene-17($\alpha$),21-diol-3,20-dione-21-acylate.

10. The process that comprises reacting 4-bromo - $\Delta^{9(11)}$ - pregnene - 17($\alpha$),21 - diol - 3,20-dione-21-acetate with a dehydrohalogenating agent to form $\Delta^{4,9(11)}$-pregnadiene-17($\alpha$),21-diol-3,20-dione-21-acetate.

11. The process that comprises reacting 4-bromo - $\Delta^{9(11)}$ - pregnene - 17($\alpha$),21 - diol - 3,20-dione-21-acetate with pyridine to form $\Delta^{4,9(11)}$-pregnadiene - 17($\alpha$),21 - diol - 3,20 - dione - 21-acetate.

12. The process that comprises reacting 4-bromo - $\Delta^{9(11)}$ - pregnene - 17($\alpha$),21 - diol - 3,20-dione-21-acetate with semicarbazide and pyruvic acid to form $\Delta^{4,9(11)}$ - pregnadiene - 17($\alpha$),21-diol-3,20-dione-21-acetate.

13. The process that comprises reacting 4-bromo - $\Delta^{9(11)}$ - pregnene - 17($\alpha$),21 - diol - 3,20-dione-21-acetate with 2,4-dinitrophenyl-hydrazine and pyruvic acid to form $\Delta^{4,9(11)}$-pregnadiene - 17($\alpha$),21 - diol - 3,20 - dione - 21 - acetate.

NORMAN L. WENDLER.
ROBERT P. GRABER.
ALFRED C. HAVEN, Jr.

No references cited.